United States Patent Office 3,389,072
Patented June 18, 1968

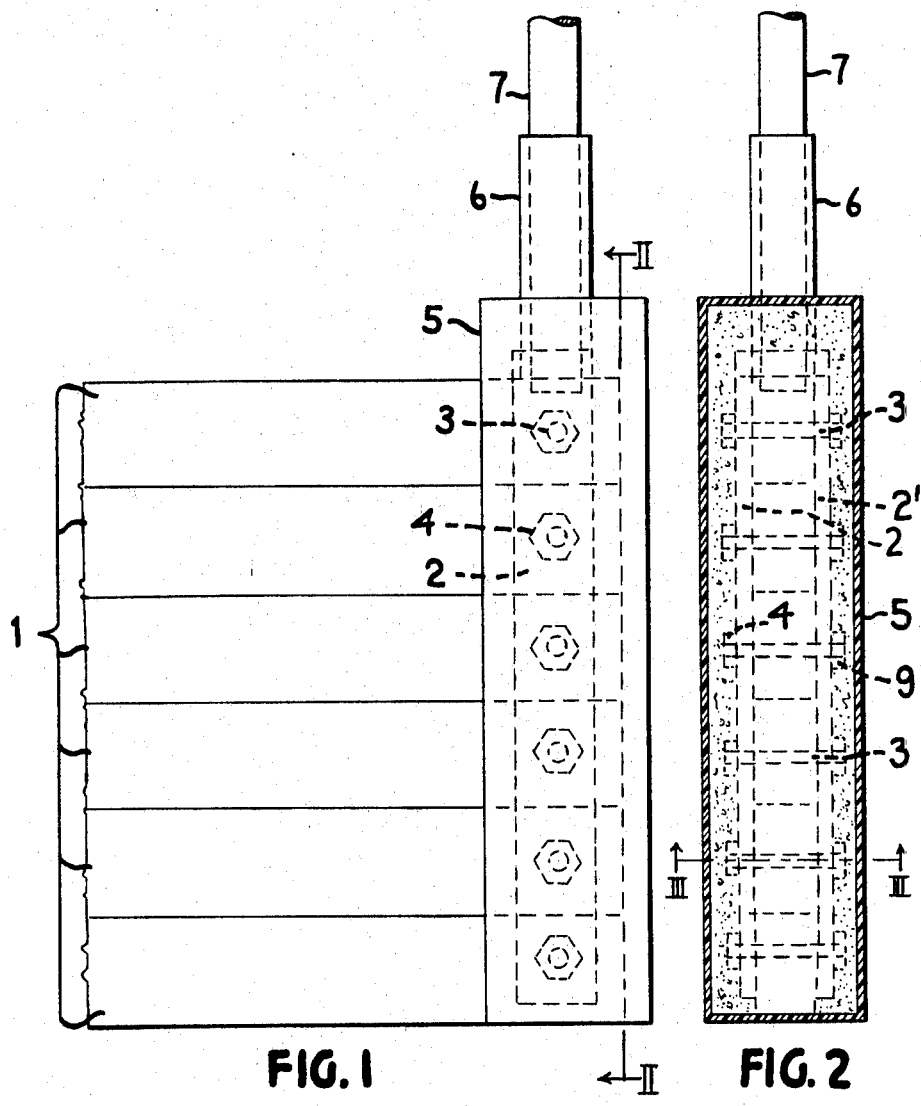
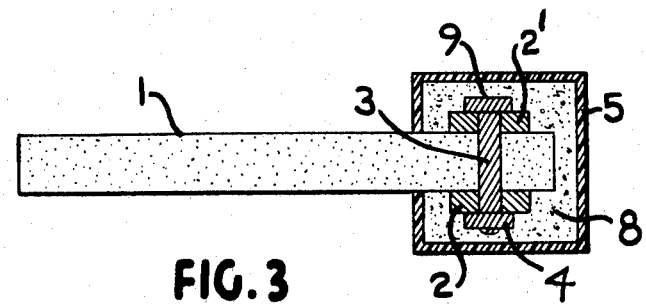

3,389,072
ELECTRODE ASSEMBLY
Arne Strandberg, Sundsvall, Sweden, assignor to Stockholms Superfosfat Fabriks Aktiebolag, Stockholm, Sweden, a corporation of Sweden
Filed Feb. 15, 1966, Ser. No. 527,537
8 Claims. (Cl. 204—288)

The present invention relates to electrolytic cells. More particularly the present invention relates to improvements in alkali-metal chlorate cells of the bipolar type. Still more particularly, the present invention relates to an improved graphite electrode and current connector useful in an alkali-metal chlorate cell.

In the construction and operation of bipolar chlorate cells having graphite electrodes the current to the cell is conventionally introduced at one end of the electrolytic cell and is withdrawn at the other end. The special terminal graphite blades at both ends of the cell are typically provided with means for electrical connection to the bus bar system of the cell room. Typical of bipolar cells utilizing graphite electrodes are the cells described in U.S. Patents 2,799,643 and 3,203,882.

In the construction of vertically arranged graphite electrodes which are utilized for the manufacture of sodium chlorate problems are encountered in their manufacture as well as in providing a suitable electrical connection to such electrodes. It is conventional practice to prepare these graphite electrodes by extrusion techniques into the desired flat blade shape. A hole is then drilled in one end of the blade and vertically through the blade to adapt it for the reception of a copper connector. The copper connector, usually a rod, is placed in the vertically drilled hole and securely fastened by casting with a special alloy, tamped amalgam for example. The free end of the copper connector projects up through the cell bath and the cell cover where it is then connected to the external bus connectors. In order to protect the free copper connector from corrosive attack of the cell electrolyte and from the gases evolved during electrolysis, the connector is typically enclosed in a graphite pipe or tube. Gradual diffusion of cell electrolyte through the graphite results in contact of electrolyte with the copper connectors quite frequently in the operation of such cells which rapidly destroys the connector. In addition, a tight low resistance joint between the graphite pipe or tube itself is difficult to obtain in all instances.

In accordance with this invention a construction of end electrodes is provided which overcomes many of these disadvantages present in the prior art. Thus, in the present invention, a plurality of graphite electrodes forming the end electrodes of a bipolar chlorate cell are cemented together one above the other to provide the desired electrode height. One end of these cemented blades is positioned between at least two electrically conductive metal straps, preferably copper, which pass in a vertical direction across the ends of the cemented blades to a point at, at slightly above the upper surface of the top electrode blade in the cell. Electrically conductive bolt members are provided at spaced intervals along the metal straps and are passed through the straps and the blades that the straps are in contact with. At least one bolt member for each blade is preferred for the best possible electrical connector. The bolt members are constructed and arranged so that they can be tightened against the straps on both sides of the blades and thus firmly affix the straps to the graphite members which the straps are in contact with. The strap members, bolts and the ends of the blades are encased in a mastic material such as a polyester resin. The polyester resin is surrounded by a non-conductive rigid plastic such as polyvinyl chloride which is sized so as to provide a proper spacing for the enclosed end electrodes and the next adjacent set of electrodes located at the end of the cell.

For a more complete description of the instant invention reference is made to the accompanying drawing in which:

FIGURE 1 shows a side elevation of an end electrode consisting of seven individual blades cemented together;

FIGURE 2 shows an end view of the end blade of FIGURE 1, and

FIGURE 3 shows a cross-section of the end blade of FIGURE 2 taken along lines III—III.

As shown in FIGURES 1, 2 and 3, an end electrode composed of six individual blades 1, cemented together to provide a unitary end electrode is shown. The ends of the blades 1 have positioned on two sides, copper straps 2 and 2'. The copper straps pass vertically across the side surfaces of the electrodes 1 and are held in firm electrical and mechanical contact with these blades 1 by means of bolts 3 and the metal nut 9 and the washer 4. The entire end assembly of blades 1, bolt 3, straps 2 and 2', and the nut 9 and washer 4 are embedded in a polyester resin generally indicated at 8. The resin 8 is enclosed in a rigid plastic envelope or casing 5, preferably a rigid polyvinyl chloride. The copper connector 7 to the external bus bar electrical supply in the cell room is preferably encased in a rigid non-conductor such as polyvinyl chloride or an oxidized titanium sheath 6 which terminates on the upper surface of the top blade of the end electrode. The copper connector 7 may be electrically joined to the upper blade of the end electrode by a pressure fit, an alloyed joint or by any other suitable mechanical means which will provide a low resistance joint. It will be observed that the polyester resin matrix 8 and the polyvinyl chloride casing 5 extend a substantial distance above the top of the uppermost blade of the end electrode. In addition the lower end of the copper connector 7 and its associated collar 6 are embedded in both the matrix 8 and the envelope or casing 5. In this manner protection of the connector element 7 is provided where it is exposed to cell electrolyte and gases by the collar 6 and in addition by the resin 8 and the rigid plastic 5.

Typical of polyester materials which may be employed to provide the matrix 8 in accordance with the instant invention are those described in U.S. Patent 2,593,787. Materials such as these may be employed alone or can conveniently be reinforced with fiberglass. Preferably, in accordance with one embodiment of the instant invention, the resins may have incorporated therein fine graphite particles to increase the heat conductivity of the assembly. Typically 5 percent by weight or more graphite in the resin is employed, generally 15 to 50 percent by weight graphite.

The rigid polyvinyl chloride casing 5 may be a product such as is manufactured by the methods described in B.I.O.S. reports 1509 and 1418. The important consideration is that the polyvinyl chloride be rigid and capable of withstanding the cell temperatures encountered. Some of the rigid polyvinyl chloride materials available for use in the present cell structure are Vinidur, Lacoflex, Hard Mipolam. While these materials typify rigid polyvinyl chlorides it will be apparent that any rigid polyvinyl chloride can be employed so long as its physical properties will enable it to withstand the cell electrolyte temperatures encountered in a chlorate cell (25° C. to about 100° C.).

The invention may be utilized not only with graphite but also with other anode materials such as for example magnetite. While copper straps 2 and 2' have been described herein for convenience it is obvious that other electrically conductive metal straps, for example aluminum, could be used. As shown in the drawing a single bolt member 3 is shown associated with each blade 1. This of course is subject to modification so that more than one bolt and clamp can be used with each blade 1 or less than one bolt can be employed per blade. Similarly, while two straps have been shown, more than two can be employed if desired.

While the invention has been described with reference to certain specific examples and illustrative embodiments it is not intended to be limited thereby except insofar as appears in the accompanying claims.

I claim:

1. An electrode assembly suitable for use in a chlorate cell comprising an electrode, at least two electrically conductive metal straps positioned on said electrode across the side surfaces thereof and at one end thereof, said straps being vertically arranged with respect to the long axis of said electrode, means traversing said straps and electrode to thereby hold said straps firmly against said electrode, a resin matrix completely encasing said straps, said means and a portion of said one end of said electrode, a rigid plastic envelope encircling and firmly attached to said matrix and means for conducting current to or from said electrode assembly.

2. The electrode assembly of claim 1 wherein said electrode is comprised of a plurality of graphite blades cemented together along one of their edges to form a unitary electrode.

3. The electrode assembly of claim 1 wherein said matrix is a polyester resin and said envelope is rigid polyvinyl chloride.

4. An electrode assembly suitable for use in a chlorate cell comprising a plurality of graphite blades positioned one above the other and cemented together at one edge to provide a unitary electrode, at least two electrically conductive straps positioned on each side of one end of said unitary electrode, said straps being positioned vertical with respect to the cemented edges of said blades, a plurality of means to hold said straps firmly against said electrode surface at least one such means being provided for each blade of said unitary electrode, a resin matrix completely surrounding said straps and said means, a rigid plastic envelope encircling and attached to said matrix and means for electrically connecting said assembly to a power source.

5. The assembly of claim 4 wherein said means for electrically connecting said assembly to a power source comprises a metal connector in contact with said unitary electrode, said connector being encased in a non-conductive corrosion resistant sheath, said connector and sheath being enveloped at the lower end thereof by said matrix and said envelope.

6. The assembly of claim 5 wherein said matrix is a polyester resin containing graphite particles therein.

7. The assembly of claim 6 wherein said envelope is a rigid polyvinyl chloride and said sheath is a polyvinyl chloride.

8. The assembly of claim 7 wherein said electrically conductive straps are copper.

References Cited

UNITED STATES PATENTS

| | | | |
|---|---|---|---|
| 804,429 | 11/1905 | Petz | 204—280 |
| 1,912,272 | 5/1933 | Gomez | 204—288 |
| 2,621,155 | 12/1952 | Williams | 204—286 XR |
| 2,799,643 | 7/1957 | Raetzsch | 204—286 XR |
| 3,331,763 | 7/1967 | Mabey | 204—290 |

FOREIGN PATENTS 447,418   5/1936   Great Britain.

HOWARD S. WILLIAMS, *Primary Examiner.*

D. R. JORDAN, *Assistant Examiner.*